March 20, 1951  G. B. HILL ET AL  2,545,579
BALE TYING MECHANISM
Filed July 22, 1946  2 Sheets-Sheet 1

INVENTORS
GEORGE B. HILL
FRANK D. JONES
BY
ATTORNEYS.

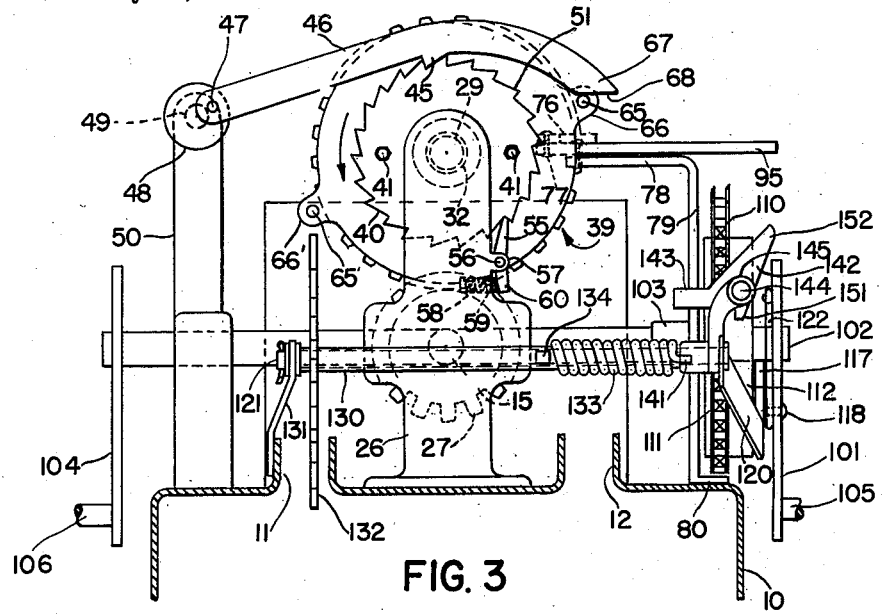

Patented Mar. 20, 1951

2,545,579

UNITED STATES PATENT OFFICE 2,545,579

BALE TYING MECHANISM

George B. Hill and Frank D. Jones, Ottumwa, Iowa, assignors to Deere Manufacturing Co., a corporation of Iowa Application July 22, 1946, Serial No. 685,517

18 Claims. (Cl. 100—20)

The present invention relates generally to bale tying mechanism and more particularly to mechanism of the type which measures the size of the bale being formed and automatically binds each bale when it attains a predetermined size, using wire or twine, which is tied around the bale by the automatic mechanism, after which the bale is discharged from the machine. The preferred embodiment of our invention relates to an automatic wire tying hay baler of the type disclosed in U. S. Patent 2,512,754, of which the present invention is in the nature of an improvement. In a machine of this type, when the bale attains its predetermined size, two strands of binding wire are wrapped around the bale by means of a pair of wire carrying arms known as "needles," which hold the wire in wrapped position until the tying mechanism can twist the ends of the wire together and cut the wire from the supply coil.

The entire tying operation must be accomplished between two consecutive strokes of the baling plunger and must allow time for the needles to be swung through the bale chamber into tying position, retained in tying position until the tying mechanism completes its operation, and then retracted from the bale case. Thus, it is evident that the amount of time within which the tying mechanism must complete its operation, is quite limited. Heretofore the tying mechanism has been actuated by power obtained from the main drive shaft of the implement.

One of the principal objects of the present invention relates to the provision of a novel and improved means for driving the bale tying mechanism. More specifically, a further object relates to the provision of means for driving the tying mechanism, which operates faster than mechanism heretofore employed.

Another object relates to the provision of a spring actuated wire tying mechanism. A related object has to do with the provision of a spring actuated mechanism with a power operated winding device for stressing the spring. Still another object relates to the provision of means for automatically controlling the winding device, whereby the latter restores the same amount of energy in the spring after each actuation of the tying mechanism. A still further object relates to the provision of control means for releasing the spring to actuate the tying mechanism, responsive to the movement of the needle control mechanism to a predetermined position.

These and other objects and advantages of our invention will be apparent to those skilled in the art after a consideration of the following description, in which reference is had to the drawings appended hereto, in which Figure 1 is a fragmentary top plan view of a bale case showing a mechanism for controlling and driving a tying mechanism;

Figure 3 is an end elevational view, taken in section along a line 3—3 in Figure 1;

Figure 4 is an elevational view taken along a line 4—4 in Figure 1; and

Figure 5 is an elevational view taken along a line 5—5 in Figure 1.

Figure 1:
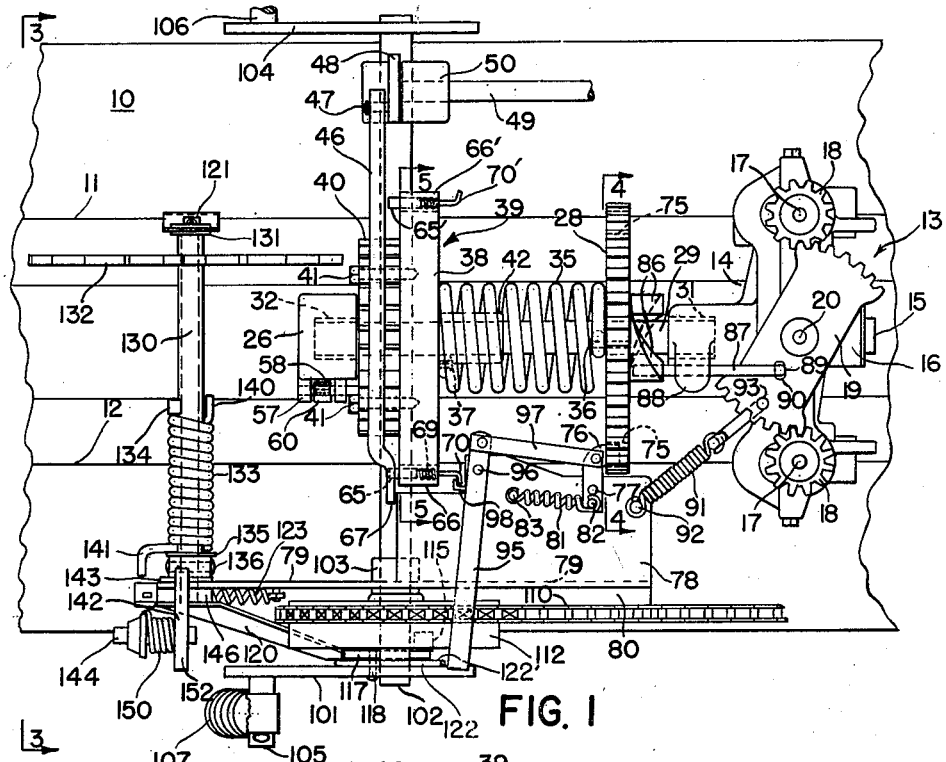

Referring now to the drawings, the bale case is indicated by reference numeral 10 and is provided with a pair of laterally spaced longitudinally extending slots 11, 12 in the top side thereof. A wire tying mechanism 13 is disposed on top of the bale case 10 and comprises a casing 14, into which extends a drive shaft 15 journaled in a pair of bearings 16 formed in the case 14. The shaft 15 drives wire twisting gears, which are not shown and described herein, inasmuch as they form no part of the present invention, but are fully disclosed in the above mentioned patent. The casing 14 also contains a pair of laterally spaced vertically disposed shafts 17, which drive the wire kinking and cutting elements within the casing 14, and which are also not shown because they do not form an essential part of this invention. The vertical shafts 17 are provided with drive pinions 18, respectively, which mesh with a centrally disposed gear segment 19 journaled on a vertical stud 20 on the center of the casing 14. The gear segment 19 is oscillated to rotate the shafts 17 first in one direction and then in the other to complete the tying operation and to sever the wires (not shown).

The shaft 15 extends longitudinally of the casing 14 and is journaled in a bearing 25 formed integrally with a vertical supporting structure 26. A gear 27 is mounted on the shaft 15 adjacent the casing 14 and is rigidly fixed thereto by means of a key 27'. The shaft 15 is driven by means of a drive gear 28, which is disposed in mesh with the shaft gear 27 and has a diameter equal to twice that of the gear 27. The drive gear 28 is fixidly mounted on a longitudinally extending shaft 29 and secured against rotation relative thereto by a key 30. The shaft 29 is journaled at one end in a bearing 31, formed integrally with the casing 14, and at its opposite end the shaft 29 is journaled in a bearing 32 in the upper portion of the support 26.

The gear 28 and shaft 29 are driven by a helical spring 35, disposed coaxially around the shaft 29 and secured to the gear 28 by a suitable bolt or rivet 36. The opposite end of the spring 35 is secured by a bolt or rivet 37 to a winding disk 38, which is part of a winding wheel 39. The winding wheel 39 comprises the disk 38 and a ratchet wheel 40 secured to the disk by a pair of diametrically opposite bolts 41. The winding wheel 39 is provided with a hub 42 secured to the disk 38 and journaled on the shaft 29, thus providing for rotation of the winding wheel 39 relative to the shaft 29 and gear 28.

The spring 35 is stressed in torsion by rotating the winding wheel 39 relative to the gear 28, while holding the latter by means of a suitable latch mechanism which will be described later. The winding wheel 39 is rotated by means of a ratchet pawl 45 formed on an arm 46 which is journaled on a crank 47, projecting from the face of a crank plate 48 fixed to a continuously rotating shaft 49, which is journaled on a bearing support 50. The shaft 49 is rotated at a constant speed by any suitable source of power (not shown). Thus it will be evident that rotation of the shaft 49 causes a reciprocating movement of the arm 46, which reciprocates the ratchet pawl 45 into successive engagement with the ratchet teeth 51 of the ratchet wheel 40, thereby causing the latter to be rotated to wind the spring 35. The ratchet wheel 40 is retained against retrograde movement by means of a holding pawl 55 mounted on a shaft 56, which is journaled in a pair of lugs 57, formed integrally with the bearing support 26. The holding pawl 55 is held in engagement with the teeth 51 by means of a compression spring 58 supported in a recess 59 in the bearing support 26 and engaging an arm 60 mounted on the shaft 56.

The reciprocating pawl arm 46 continues to rotate the winding wheel 39 until the pawl arm 46 is disabled by means of a dog 65 or plunger, which is slidably mounted in an aperture in a lug 66 on the periphery of the winding disk 38. The plunger 65 extends outwardly from the face of the lug 66 and engages the extended end portion 67 of the pawl arm 46, moving upwardly under the end portion 67 and lifting the pawl 45 out of engagement with the ratchet teeth 51. The end portion 67 is provided with a generally horizontal bearing surface 68, which rests upon the plunger 65 and permits lateral reciprocation of the pawl arm 46 in its inoperative position out of engagement with the ratchet wheel 40. The opposite end of the dog 65 is reduced in diameter and it is encircled by a helical compression spring 69 which urges the dog 65 outwardly to register with the lower edge 68 of the extension 67. The extreme end 70 of the reduced diameter portion of the dog 65 is bent to form a hook, by means of which the dog 65 can be retracted against the compression force of the spring 69 to release the dog 65 from the pawl arm 46, permitting the latter to drop into engagement with the ratchet wheel 40, thus initiating a winding operation.

A second plunger or dog 65' is slidably mounted in a lug 66' on the outer periphery of the disk 38 in diametrically opposed relation to the dog 65 just described, and is of similar construction and operation. Thus, by providing two releasable dogs or plungers 65, 65', the winding wheel 39 is rotated through 180 degrees by the reciprocating pawl arm 46 until the latter is lifted to inoperative position by the succeeding plunger, thereby terminating the winding operation.

The drive gear 28 is provided with a pair of diametrically opposed radially extending slots 75, 75' extending inwardly from the circumference of the gear 28 between a pair of adjacent gear teeth. A latch dog 76 is pivotally mounted on a pin 77 supported on a horizontal plate 78, which turns downwardly at right angles thereto, as indicated at 79, the lower edge of the vertical portion 79 being provided with a horizontal flange 80 mounted on top of the bale case 10. A tension spring 81 is secured by a bolt 82 to the latch dog 76 on the opposite side of the pivot pin 77, and is anchored at 83 to the top of the supporting plate 78.

When the latch dog 76 is retracted from the slot 75 by pivoting the dog in a counterclockwise direction against the tension of the spring 81, as viewed in Figure 1, the torsionally stressed spring 35 rotates the gear 28 in a counterclockwise direction, as viewed in Figure 4, until the latch dog 76 drops into the diametrically opposite slot 75', thus arresting rotation of the gear 28 after one-half revolution. The face of the gear 28 is recessed at 84, 84', adjacent the slots 75, 75' to provide inwardly inclined or beveled surfaces for leading the end of the latch dog 76 into the slots 75, 75', successively, to prevent the gear 28 from turning more than one-half revolution. Obviously, one-half revolution of the drive gear 28 rotates the twister drive shaft 15 through one complete revolution, after which the winding device 39 is rotated one-half revolution by the pawl arm 46 to restore the energy in the spring 35.

The gear segment 19 is oscillated about the supporting stud 20 by means of inclined camming surfaces 86, 86' raised on the face of the gear 28 opposite the spring 35 and adapted to engage a camming rod 87 or plunger which slides axially in a bearing sleeve 88 mounted on the casing 14. The opposite end of the cam rod 87 is turned downwardly at 89 into a slot 90 in the gear segment 19. Thus, as the gear 28 rotates, the inclined surface 86 forces the cam rod 87 outwardly away from the gear 28, thereby swinging the gear segment 19 in a counterclockwise direction, as viewed in Figure 1. When the cam rod 87 disengages from the camming surface 86, the gear segment 19 is returned to its original position by means of a tension spring 91 which is connected by a bolt 93 to the segment 19 and is anchored at the opposite end at 92 on the plate 78.

The latch dog 76 is released by means of a release lever 95 pivotally mounted on the top of the plate 78 by means of a pivot pin 96. The release lever 95 is connected by a link 97 to the latch dog 76, so that a counterclockwise movement of the release lever 95, as viewed in Figure 1, will release the latch dog 76 from the slot 75 or 75'. The release lever 95 is also provided with a hook 98 engageable with the hook 70 on the end of the dog 65, so that when the release lever 95 is swung to disengage the latch dog 76 from the gear 28, the hook 98 also pulls the hooked end 70 of the plunger 65 to release the pawl arm 46, with the result that the latter immediately begins to rewind the spring 35.

The latch release lever 95 is engaged by an arm 101 mounted on a transverse shaft 102, which is journaled in a bearing 103 in the vertical portion 79 of the supporting plate at one side of the bale case, and is journaled at the opposite side of the bale case in the supporting member 50. Another arm 104 is fixed to the shaft 102 on the opposite side of the bale case 10. A pair of cranks 105, 106 extend outwardly from the ends of the arms 101, 104, respectively, and are connected with the needles (not shown) by means of springs 107 extending downwardly along opposite sides of the bale case 10, respectively. During the tying operation, the shaft 102 is rotated through one complete revolution in a clockwise direction, as viewed in Figure 2. During the first portion of the revolution, the needles are raised through the bale case 10, to their tying position, after which the arm 101 engages the release lever 95 to release the latch dog 76 from the gear 28. The spring 35 then rotates the gear 28 through one-half revolution, which drives the shaft 15 through a complete revolution to complete the tying operation. The spring 35 is sufficiently powerful to actuate the tying mechanism more quickly than has been accomplished in previous power transmitting mechanism.

The shaft 102 is rotated by power transmitted through a drive chain 110 trained over a sprocket 111, which is formed on the circumference of a rotary casing member 112 of a self-interrupting type clutch mechanism. The casing 112 is provided with a recess defining an internal annular track 113 in the outer face of the casing. The track 113 is provided with a hump 114 extending inwardly therefrom, and engageable with a roller 115 mounted on a pin 116 supported on a bell crank 117, which is pivotally mounted on a pin 118 supported on the arm 101. The other arm of the bell crank 117 extends outwardly beyond the periphery of the clutch casing 112 and engages a trip arm 120, which is mounted on a shaft 121, the latter being rockably supported for movement about an axis parallel to the shaft 102 and spaced therefrom. The trip arm 120 holds the crank arm 117 in a position in which the latter will hold the roller 115 out of engagement with the annular track 113 and clear of the hump 114, thereby permitting the clutch casing 112 to rotate freely on the shaft 102. By rocking the rockshaft 121 and trip arm 120 in a clockwise direction, as viewed in Figure 2, the trip arm is disengaged from the outer end of the bell crank 117, whereby the latter is swung about its supporting pivot 118 by means of a spring wire 122 attached to the bell crank 117 and anchored at 122' to the inner side of the arm 101. The spring 122 rotates the bell crank 117 to bring the roller 115 into engagement with the annular track 113, and when the hump 114 engages the roller 115, the arm 101 is carried around with the clutch casing 112 through the bell crank 117. During the rotation of the arm 101 and shaft 102, the trip arm 120 is returned to its original position by means of a spring 123 connected between a lug 124 fixed to the arm 120 and a bolt 125 secured to the plate 79. The trip arm 120 is engaged in this position by the outer arm of the bell crank 117, thereby rocking the latter to disengage the roller 115 from the hump 114. The clutch member 112 is synchronized with the movement of the baling plunger within the bale case through the drive chain 110, so that the hump 114 engages the roller 115 at the proper point in the cycle of the plunger, as explained above. Thus, it is evident that the trip arm 120 can be rocked at any time during the cycle of the baling plunger without interfering with the timing of the wire tying mechanism.

The shaft 121 extends through a sleeve 130, which is rotatable thereon, and the end of the shaft 121 is journaled in a bearing 131 in the form of an apertured plate secured to the top of the bale case. The opposite end of the shaft 121 is journaled within the vertical supporting plate 79. The sleeve 130 carries a serrated measuring wheel 132, which projects through the slot 11 in the top of the bale case, with the teeth of the wheel 132 in engagement with the bale being formed. A helical spring 133 is coiled about the sleeve 130 between a lug 134 welded to the sleeve 130 and a collar 135 fixed to the shaft 121 by a pin 136. The collar 135 also serves as a thrust bearing at one end of the sleeve 130, the bearing plate 131 acting against the opposite end of the sleeve. The end of the spring 133 nearest the wheel 132 is turned in an axial direction, as indicated at 140, in register with the lug 134, so that rotation of the wheel 132 rotates the lug 134 into engagement with the end 140 of the spring. The opposite end of the spring 133 is extended tangentially outwardly and has an outer end 141 turned axially and is adapted to engage a trip plate 142 which is in the form of a bell crank having an inner arm 143 extending horizontally in a position in which it will be engaged by the outer end 141 of the spring 133. The trip plate 142 is secured to a supporting pin 144, which is journaled in an arm 145 of a casting which also has a hub 146 mounted on the shaft 121. The trip arm 120 is secured to the casting hub 146 by bolts 147. The trip plate 142 is urged in a clockwise direction, as viewed in Figure 3, by means of a coil spring 150, which acts in torsion between the casting arm 145 and the trip plate 142 and the latter is provided with a downwardly extending abutment 151, which engages the casting arm 145 to prevent any further movement in a clockwise direction from the position shown in Figure 3. The trip plate 142 can, however, be rotated in a counterclockwise direction, in order to tilt the arm 143 downwardly out of engagement with the end 141 of the spring 133. The trip plate 142 has an upwardly extending arm 152, the lower edge of which is inclined upwardly and outwardly overhanging the bale case 10 in the path of rotary swinging movement of the needle actuating arm 101.

Figure 2:
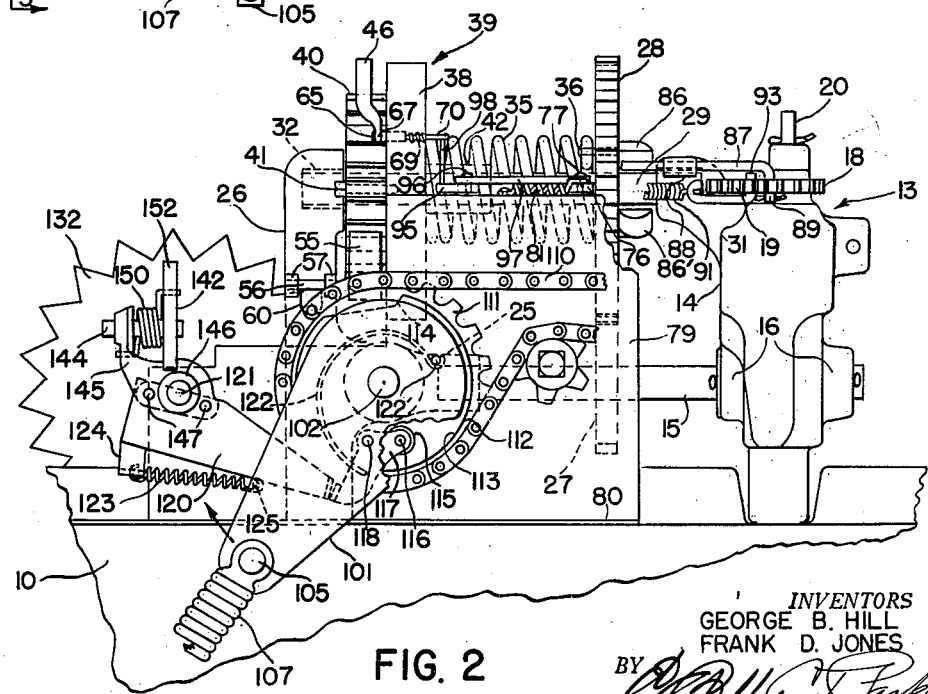
Figure 2 is a side elevational view of the mechanism shown in Figure 1.

During the baling operation, the bales move toward the left, as viewed in Figure 1, gradually rotating the measuring wheel 132 in a clockwise direction, as viewed in Figure 2, thereby rotating the sleeve 130 relative to the shaft 121. By the time the wheel 132 has made nearly a complete revolution, the lug 134 on the sleeve 130 moves into engagement with the end 140 of the spring 133, while the other end 141 of the spring moves into engagement with the arm 143 of the bell crank or trip plate 142. Further rotation of the wheel 132 and sleeve 130 exerts a force through the lug 134, stressing the spring 133 in torsion between the lug 134 and the arm 143 and exerting a force against the trip plate 142 which tends to swing the arm 120 and shaft 121 in a clockwise direction, as viewed in Figure 2, but this is resisted by the spring 123 which tends to hold the arm 120 in a holding position in engagement with the clutch bell crank 117. Movement of the wheel 132, however, builds up a torsional stress in the spring 133 which finally overcomes the tension spring 123, which causes the trip plate 142, shaft 121, and arm 120 to swing in a clockwise direction, thereby disengaging the arm 120 from the bell crank 117. The spring wire 122 then shifts the bell crank 117 to bring the roller 115 into contact with the inner track 113, and when the hump 114 engages the roller 115, the shaft 102 and arm 101 begin to rotate in a clockwise direction.

The arm 101 swings upwardly, engaging the inclined surface of the upper trip plate arm 152, forcing the latter in a counterclockwise direction, as viewed in Figure 3. This swings the spring engaging arm 143 downwardly, disconnecting it from the end 141 of the spring 133, thereby causing the latter to contract and snap past the engaging arm 143. The coil spring 150 immediately restores the trip plate 142 to its original position, with the lower arm 151 bearing against the casting arm 145, and the spring 123 returns the trip arm 120 into engagement with the periphery of the clutch casing 112, where it is in a position to engage the arm of the bell crank 117 after the clutch has made a complete revolution, thereby disconnecting the roller 115 from the hump 114 and the casing 112.

This action of the trip plate 142 and spring 133 insures that the tying mechanism will actuate only once, regardless of whether the measuring wheel 132 has any movement or not during the rotation of the clutch. The tripping mechanism is disclosed and claimed in a co-pending application, Serial No. 616,802, filed September 17, 1945, by Tuft and West.

We claim:

1. In bale tying mechanism, a drive shaft, a helical spring adapted to be stressed in torsion for rotating said shaft, means connecting one end of said spring with said shaft, a releasable latch device for normally holding said shaft against rotation, a continuously rotatable shaft, winding mechanism connected with the other end of said spring, and means responsive to release of said latch device for actuating said winding mechanism by power transmitted from said continuously rotatable shaft.

2. In bale tying mechanism, a drive shaft, a helical spring adapted to be stressed in torsion for rotating said shaft, means connecting one end of said spring with said shaft, a releasable latch device for normally holding said shaft against rotation, means for releasing said latch device to initiate a movement of said drive shaft by power supplied by said spring, a power driven winding device associated with the other end of said spring, and means responsive to an actuation of said spring and said drive shaft for causing said winding mechanism to wind said spring.

3. In bale tying mechanism, a drive shaft, a helical spring adapted to be stressed in torsion for rotating said shaft, means connecting one end of said spring with said shaft, a releasable latch device for normally holding said shaft against rotation, means for releasing said latch device to initiate a movement of said drive shaft powered by said spring, said latch device being reengageable to arrest movement of said shaft after the latter has rotated through a predetermined angle, a power driven winding device associated with the other end of said spring, and means responsive to an actuation of said spring and said drive shaft for effecting an operation of said winding device to restore the energy in said spring.

4. In bale tying mechanism, a drive shaft, a helical spring adapted to be stressed in torsion for rotating said shaft, means connecting one end of said spring with said shaft, a releasable latch device for normally holding said shaft against rotation, means for releasing said latch device to initiate a movement of said drive shaft powered by said spring, said latch device being reengageable to arrest movement of said shaft after the latter has rotated through a predetermined angle, a power driven winding device comprising a ratchet wheel fixed to the other end of said spring, a continuously reciprocating pawl engageable with said ratchet wheel to turn the latter, a holding pawl engaging said ratchet wheel for preventing retrograde movement of the latter, and means for disabling said winding device responsive to restoration of the energy in said spring.

5. In bale tying mechanism, a drive shaft, a helical spring adapted to be stressed in torsion for rotating said shaft, means connecting one end of said spring with said shaft, a releasable latch device for normally holding said shaft against rotation, means for releasing said latch device to initiate a movement of said drive shaft powered by said spring, said latch device being reengageable to arrest movement of said shaft after the latter has rotated through a predetermined angle, a power driven winding device comprising a ratchet wheel fixed to the other end of said spring, a continuously reciprocating pawl engageable with said ratchet wheel to turn the latter, a holding pawl engaging said ratchet wheel for preventing retrograde movement of the latter, and a dog movable with said wheel into engagement with said reciprocating pawl for lifting the latter to an inoperative position responsive to movement of said ratchet wheel to a position in which said spring is wound.

6. In bale tying mechanism, a drive member, spring means connected with said member for actuating the latter, a latch for preventing actuation of said drive member, means for releasing said latch to effect an actuation of said member by said spring, and means for stressing said spring including a ratchet wheel connected to said spring and rotatable to stress the latter, a continuously reciprocating pawl engageable with said ratchet wheel to turn the latter, and means movable with said ratchet wheel and engageable with said pawl to shift the latter out of engagement with said wheel when said spring is stressed.

7. In bale tying mechanism, a drive member, spring means connected with said member for actuating the latter, a latch for preventing actuation of said drive member, means for releasing said latch to effect an actuation of said member by said spring, and means for stressing said spring including a ratchet wheel connected to said spring and rotatable to stress the latter, a continuously reciprocating pawl engageable with said ratchet wheel to turn the latter, a dog movable with said ratchet wheel into engagement with said pawl to shift the latter out of engagement with said wheel when said spring is stressed, and means actuated by said latch release means for disabling said dog to permit reengagement of said pawl with said ratchet wheel.

8. In bale tying mechanism, a rotatable drive member, a helical spring having one end attached to said member and adapted to be stressed in torsion for rotating the latter, a releasable latch for holding said member against rotation, means for releasing said latch to permit rotation of said member, and means for stressing said spring including a ratchet wheel connected to the other end of said spring and rotatable to stress the latter, a continuously reciprocating pawl engageable with said ratchet wheel to turn the latter, a holding pawl biased into engagement with said ratchet wheel for preventing retrograde movement of the latter, and means movable with said ratchet wheel and engageable with said reciprocating pawl to disable the latter when said spring is stressed.

9. In bale tying mechanism, a rotatable drive member, a helical spring having one end attached to said member and adapted to be stressed in torsion for rotating the latter, a releasable latch for holding said member against rotation, means for releasing said latch to permit rotation of said member, and means for stressing said spring including a ratchet wheel connected to the other end of said spring and rotatable to stress the latter, a continuously reciprocating pawl engageable with said ratchet wheel to turn the latter, a holding pawl biased into engagement with said ratchet wheel for preventing retrograde movement of the latter, a dog mounted on said ratchet wheel and movable therewith into engagement with said reciprocating pawl when said spring is stressed, and means actuated by said latch release means for disabling said dog to permit reengagement of said reciprocating pawl with said ratchet wheel.

10. In bale tying mechanism, a drive shaft rotatable through one revolution to complete a tying operation, a pinion on said shaft, a drive gear meshing with said pinion and having a diameter equal to twice the diameter of said pinion, a helical spring disposed coaxial with said gear and having one end attached to the latter, said spring being adapted to be stressed in torsion for rotating said gear, a releasable latch for holding said gear against rotation, said gear being provided with a pair of diametrically opposed recesses in a side thereof to receive said latch, means for shifting said latch out of engagement with said gear to permit rotation of the latter by power from said spring, and means for stressing said spring including a winding wheel connected to the opposite end of said spring and rotatably mounted coaxially of the latter, means for rotating said wheel, a pair of releasable stops disposed in diametrically opposed relation on said wheel and adapted to arrest the rotation of the latter after the torsional stress has been restored, and means actuated by said latch shifting means for releasing one of said stops to initiate rotation of said winding wheel.

11. In bale tying mechanism, a continuously moving driving member, an intermittently movable driven member, power transmitting means for connecting said driven member to said driving member to be driven by the latter through a predetermined extent of movement, a bale measuring device for controlling said power transmitting means to initiate a movement of said driven member, a tier drive member, a wind-up spring having one end connected to said tier drive member, a winding device connected to the opposite end of said spring, a disengageable element engageable with the tier drive member for holding said tier drive member against the force of said spring, and means connected with said element and engageable by said driven member during a movement of the latter for disengaging said element from the tier drive member to initiate a movement of said tier drive member by energy stored in said spring.

12. In bale tying mechanism, a continuously moving driving member, an intermittently movable driven member, power transmitting means for connecting said driven member to said driving member to be driven by the latter through a predetermined extent of movement, a bale measuring device for controlling said power transmitting means to initiate a movement of said driven member, a tier drive member, a wind-up spring having one end connected to said tier drive member, a winding device connected to the opposite end of said spring, a disengageable element engageable with the tier drive member for holding said tier drive member against the force of said spring, a control element associated with said winding device and shiftable to cause the latter to restore energy in said spring, and means connected with said disengageable element and with said control element and engageable by said driven member during a movement of the latter for disengaging said disengageable element from the tier drive member and for shifting said control element to initiate actuation of said tier drive member and said winding device.

13. In bale tying mechanism, a continuously moving driving member, an intermittently movable driven member, power transmitting means for connecting said driven member to said driving member to be driven by the latter through a predetermined extent of movement, a bale measuring device for controlling said power transmitting means to initiate a movement of said driven member, a tier drive member, a wind-up spring having one end connected to said tier drive member, a disengageable element engageable with the tier drive member for holding said tier drive member against the force of said spring, a ratchet wheel attached to the opposite end of said spring, a continuously reciprocating pawl engageable with said wheel for rotating the same to wind said spring, a holding pawl engaging said wheel to prevent retrograde movement of the latter, a second disengageable element mounted on said wheel and movable into engagement with said reciprocating pawl when said spring is stressed for disabling said pawl, and means connected with said elements and engageable by said driven member during a movement of the latter for disengaging said first element from the tier drive member and said second element from said pawl to initiate an actuation of said tier drive member and to restore said reciprocating pawl to operative condition.

14. In a baler or the like having means for receiving material to be baled and tying mechanism for tying such material, the combination of: a first continuously operating driving member; a first drivable and normally inactive tier member; a spring motor connected to the tier member; first connectible and disconnectible driving means for loading the spring motor by the driving member; means operative to hold the spring motor during loading thereof and releasable to provide for unloading of the motor to drive the tier member for a predetermined period; actuating means responsive to loading of the spring motor for disengaging said driving means; a second continuously operating driving member; a second drivable tier member; second connectible and disconnectible driving means for effecting intermittent operation of the second tier member for predetermined periods; means responsive to a predetermined accumulation characteristic of material in the receiving means of the baler for effecting connection of the second driving means; means responsive to operation of the second tier member in one of its periods for releasing the aforesaid motor-holding means; means responsive to unloading of the motor to re-connect the first means; second means responsive to unloading of the motor to restore the aforesaid motor-holding means; and means responsive to predetermined operation of the second tier member in one of its periods for disconnecting the second driving means.

15. In a baler or the like having means for receiving material to be baled and tying mechanism for tying such material, the combination of: a first continuously operating driving member; a first drivable and normally inactive tier member; a spring motor connected to the tier member; first connectible and disconnectible driving means for loading the spring motor by the driving member; means operative to hold the spring motor during loading thereof and releasable to provide for unloading of the motor to drive the tier member for a predetermined period; actuating means responsive to loading of the spring motor for disengaging said driving means; a second continuously operating driving member; a second drivable tier member; second driving means alternately connectible and disconnectible between the second driving member and the second tier member for intermittently driving the latter by the former; means responsive to driving of the second tier member for releasing the motor-holding means; means responsive to unloading of the motor for re-connecting the first driving means; and second means responsive to unloading of the motor to restore the motor-holding means.

16. In a baler or the like having means for receiving material to be baled and tying mechanism for tying such material, the combination of: a first continuously operating driving member; a first drivable and normally inactive tier member; a spring motor connected to the tier member; first connectible and disconnectible driving means for loading the spring motor by the driving member; means operative to hold the spring motor during loading thereof and releasable to provide for unloading of the motor to drive the tier member for a predetermined period; actuating means responsive to loading of the spring motor for disengaging said driving means; a second continuously operating driving members; a second drivable tier member; second driving means alternately connectible and disconnectible between the second driving member and the second tier member for intermittently driving the latter by the former; means responsive to driving of the second tier member for releasing the motor-holding means; means responsive to driving of the first tier member for its predetermined period for re-connecting the first driving means; and second means responsive to driving of the first tier member for said predetermined period to restore the motor-holding means.

17. In a baler or the like having means for receiving material to be baled and tying mechanism for tying such material, the combination of: a continuously operating driving member; a drivable and normally inactive tier member; a spring motor connected to the tier member; connectible and disconnectible driving means for loading the spring motor by the driving member; means operative to hold the spring motor during loading thereof and releasable to provide for unloading of the motor to drive the tier member for a predetermined period; actuating means responsive to loading of the spring motor for disengaging said driving means; an intermittently driven element operating in regular cycles of alternate motion and rest periods; means responsive to motion periods of said driven element for releasing the motor-holding means; means connected between the tier member and the motor-driving means and operative in response to driving of the tier member for its predetermined period for re-connecting said driving means responsive to unloading of the motor to restore the motor-holding means.

18. In bale tying mechanism: a continuously operating driving member; a normally inactive driven member; releasable means normally holding the driven member inactive; a spring motor connected to the driven member; disconnectible driving means connectible between the spring motor and the driving member for loading the motor while the driven member is held by the holding means; means responsive to a predetermined loaded condition of the motor for disconnecting said driving means; actuating means opertaing in alternate active and inactive cycles and connected to the holding means and operative in an active cycle to release the holding means for unloading of the motor to drive the driven member; means responsive to a predetermined extent of driving of said driven member for restoring said holding means to member-holding condition; and means responsive to a predetermined extent of driving of said driven member for reconnecting the driving means between the driving member and the motor.

GEORGE B. HILL.
FRANK D. JONES.

REFERENCES CITED

The following references are of record in the file of this patent:

UNITED STATES PATENTS

| Number | Name | Date |
|---|---|---|
| 503,997 | Strong | Aug. 29, 1893 |
| 1,253,078 | Mordaunt | Jan. 18, 1918 |
| 1,620,998 | Clark | Mar. 15, 1927 |
| 1,737,400 | Arnesen | Nov. 26, 1929 |
| 2,405,688 | Crumb | Aug. 13, 1946 |